United States Patent [19]

Rabatin

[11] 3,795,814

[45] Mar. 5, 1974

[54] X-RAY IMAGE CONVERTERS UTILIZING LANTHANUM AND GADOLINIUM OXYHALIDE LUMINOUS MATERIALS ACTIVATED WITH THULIUM

[75] Inventor: Jacob G. Rabatin, Chardon, Ohio

[73] Assignee: General Electric Company, Schenectady, N.Y.

[22] Filed: Aug. 16, 1972

[21] Appl. No.: 281,217

[52] U.S. Cl.................. 250/460, 250/458, 250/483
[51] Int. Cl............................................. H01j 1/62
[58] Field of Search .............. 250/80, 458, 460, 483

[56] References Cited
UNITED STATES PATENTS 3,499,150  3/1970  Tajima et al.......................... 250/80

3,650,976  3/1972  Luckey............................. 250/80 X

FOREIGN PATENTS OR APPLICATIONS 183,308  6/1966  U.S.S.R................................ 250/80

*Primary Examiner*—Archie R. Borchelt
*Attorney, Agent, or Firm*—John F. McDevitt; Henry P. Truesdell; Frank L. Neuhauser

[57] ABSTRACT

Oxyhalides of lanthanum and gadolinium activated with thulium are found to be superior in their conversion efficiency of X-rays to visible light when compared with conventional X-ray phosphors. These phosphors are used as X-ray image converters generally, and can be used in such devices as X-ray image-intensifier tubes, in fluoroscopic screens and in radiographic intensifier screens.

5 Claims, No Drawings

X-RAY IMAGE CONVERTERS UTILIZING LANTHANUM AND GADOLINIUM OXYHALIDE LUMINOUS MATERIALS ACTIVATED WITH THULIUM

BACKGROUND OF THE INVENTION

The present invention related to rare earth oxyhalide phosphors activated with thulium for the conversion of X-rays to visible light and to related X-ray image converter devices utilizing such luminescent materials.

In recently issued U.S. Pat. No. 3,617,743, there is described and claimed lanthanum and gadolinium oxyhalide luminescent materials activated with terbium as a more efficient luminescent material for converting X-radiation to visible light. Various related image converter devices utilizing said luminescent materials are also described and claimed in this patent including X-ray image intensifier tubes, fluoroscopic screens, and radiographic intensifier screens. U.S. Pat. Nos. 3,591,516 and 3,607,770 disclose various processes which can be used to prepare the luminescent material as well as still other luminescent materials having related chemical compositions.

It is also known to prepare a lanthanum oxychloride phosphor activated with thulium which emits a blue luminescence when excited by cathode rays. More particularly, USSR Patent 183,308 discloses and claims such luminescent material along with a method of preparing the phosphor by direct sintering of the starting materials at temperatures in the range 900°–1,000° C. A starting mixture of $La_2O_3$ with $NH_4CL$ and thulium metal is first dried at 100°–120° C before the sintering reaction. Experience with this method has shown that the phosphor product thereby obtained averages 1 micron or less in particle size and exhibits approximately 1.4 times more lumen brightness than commercial phosphors now in use.

For X-ray image converter applications, especially when used in medical radiography, it becomes desirable to improve both speed and brightness of response for conversion of the X-rays to visible light. Calcium tungstate phosphors have been the conventional luminescent material used in such applications for a number of years. For example, this conventional fluorescent material has been employed in X-ray intensifying screens for use with photographic film. Typically, such films are placed between two (2) intensifying screens in specially designed cassettes with said phosphor being capable of absorbing the X-rays in the region of interest for conversion to blue-near ultraviolet radiation where the photographic film is most sensitive. A faster screen is desirable to reduce the amount of X-ray exposure to the patient, and with such faster response, further minimizing the occurrence of a blurred image from physical movement by the patient. A more efficient conversion response by the phosphor which produces a visible image having higher brightness at a given level of X-ray exposure is also desirable in medical radiography since it enhances the ability to visually detect an object in the image.

Still, a third important factor in the use of a solid crystalline phosphor for X-ray image converter applications is the size and uniformity of the individual phosphor particle. More particularly, optical scattering effects, which produce a blurred image are caused if the individual phosphor particles are below a certain size or if the phosphor particles are irregular in shape. The most suitable phosphor crystal size range for a 4 mil thick intensifier screen is not less than about 2 microns in particle size and not more than about 12 microns in particle size. The optical scattering coefficient for a 1 micron size phosphor particle is approximately 4 times that for a particle size range between 3 and 4 microns and blurred images have been experienced with phosphors having a significant number of particles below 1.5 micron diameter. Much the same undesirable result can be experienced if the phosphor particles are sufficiently irregular in shape such that a uniform high packing density cannot be obtained. In this latter regard, the phosphor product prepared as disclosed in the aforementioned Russian patent is composed of open structure aggregates similar to grapelike clusters which do not pack uniformly and exhibit packing densities less than 50 percent of the theoretical density. Intensifier screens prepared from such phosphor material yields a mottled and grainy image pattern on photographic film which is unsuitable for X-ray image converter applications.

An important object of the invention, therefore, is to provide an improved phosphor with high sensitivity to X-rays and efficient conversion to near ultraviolet-blue emission. A further object of the invention is to provide a phosphor having the proper particle shape and size for optimum packing when employed as an X-ray image converter.

SUMMARY OF THE INVENTION

The present invention comprises X-ray image converter devices utilizing well-formed crystals of a material essentially, according to the formula:

$$Ln\ O\ X: Tm^{+3}$$

wherein,
Ln is one or more of La and Gd
X is one or more of Cl and Br
Tm is present as an activator from about 0.05 to 1 mole percent The above described phosphors are in the form of a particulate mass having an average particle size of approximately 2 microns diameter or greater and have been found to exhibit approximately 3.3 times the speed of a conventional calcium tungstate phosphor in the 40–100 KeV region of the X-ray spectrum.

Embodiments of the invention include X-ray image converters such as radiographic intensifier screens and fluoroscopic screens, comprising a thulium activated phosphor of the invention; X-ray image intensifier tubes comprising an X-ray to visible light converter screen made with a thulium-activated phosphor of the invention, a spectrally matched photo-emissive surface capable of converting the light image into an electron image, and a suitable electron-optic system capable of focusing and minifying said electron image onto a second high-resolution phosphor screen also known as the exit screen, said phosphors of the invention based on lanthenum oxychloride or oxybromide or gadolinium oxychloride or oxybromide further containing between 0.002 and 0.003 moles of thulium per mole of the phosphor. A more detailed description of the structural configuration for the various X-ray image converters can be found in the aforementioned U.S. Pat. No. 3,617,743 patent thus need not be repeated in connection with the present invention.

DESCRIPTION OF THE PREFERRED EMBODIMENTS

The applicant has found that certain oxyhalides of lanthanum and gadolinium activated with thulium as well formed and approximately stoichiometric crystals provide efficient conversion of X-ray to visible light. When such luminescent materials are prepared under conditions which lead to significant deviation from a stoichrometric composition there can be decreased light production efficiency from poorly crystallized phosphor particles. Deleterious performance may also be caused by the formation of heterophase crystallites which can be detected by routine X-ray defraction and analysis. As an example, the method of preparing thulium activated lanthanum oxychloride phosphor as described in the aforementioned Russian patent utilizes $NH_4Cl$ as a starting material which at the reactant temperatures produces free ammonia which acts as a moderately strong reducing agent to produce some thulium in the divalent state and could account for the reduced efficiency. Additionally, the X-ray diffraction studies performed upon said material indicating that while LaOCl is produced as the major phosphor phase by such method, there is present certain unidentified X-ray lines which indicate that a minor second phase in the phosphor is also present.

To prepare the improved stoichiometric phosphors of the present invention having both the desirable shape and size distribution for optimum light conversion in X-ray image converter devices, the two (2) general preferred methods described in the aforementioned patents are employed. By adapting said general methods with different amounts of a thulium precursor material in substitution for a terbium activator there can be obtained suitable luminescent material for X-ray image converter applications. For such usage, the luminescent screen can be prepared by dispersing one of the phosphors of the invention in a suitable resin binder and then casting the screen upon a supporting base member according to techniques known in the art. By reason of the already known phosphor preparation methods as well as the known techniques for construction of a suitable X-ray image converter device, it becomes unnecessary to further elaborate upon these aspects of the present invention beyond providing a specific illustrative embodiment.

Accordingly, a preferred process for preparing LaOBr: 0.002 Tm with the desired crystalline size and form utilizes recrystallization of the phosphor composition in an alkaline metal halide. To prepare the starting rare-earth oxide mixture, 5.6 grams $Tm_2O_3$ and 2,330 grams of $La_2O_3$ are dissolved in 3.02 liters of concentrated $HNO_3$. The solution is diluted to 18 liters with water and subsequently mixed with 50 liters of oxalic acid solution containing 5 kilograms of oxalic acid. After filtration, the mixed lanthanum and thulium oxalate precipitate is fired in air for approximately 2 hours which produces a suitable rare-earth oxide mixture to prepare the phosphor. The fired product is thereafter blended with 1,440 grams of $NH_4Br$ and the blended mixture is then fired for an additional 2 hours at 400° C. in a covered container to form the activated phosphor composition. After completing the initial phosphor preparation, a blended mixture is prepared with 531 grams of KBr and the mixture is then fired for 2 hours at approximately 850° C in a covered container under ambient air conditions to obtain a recrystallized final LaOBr: 0.002 Tm product comprising well-formed crystals having an average particle size of 2 microns or greater. The recrystallized phosphor is then washed free of KBr, dried and sifted through 325 mesh screen size to produce the final X-ray material.

Performance measurements were made upon the above prepared phosphor for comparison with other prior art phosphors when suspended in a suitable organic binder system and deposited on a sub-strate to form intensifier screens. More particularly, test screens were prepared with the above phosphor as well as with a LaoCl: .002 Tm phosphor prepared according to the aforementioned Russian patent at the same screen thickness of approximately 4 mils. Additional screens were tested utilizing standard calcium tungsten phosphor at the same thickness. The comparative response of these screens was measured when exposed to X-rays at 70–100 KeV intensity using a one inch (1 inch) aluminum filter at 30 inch distance. The results, together with absolute density, relative X-ray absorption in milliroentgens and resolution measurements, are listed in Table I below.

TABLE I

| PHOSPHOR | Absolute Density qm/cm³ | Screen x-ray abs. at 80 KV peak 10″body filtration | Relative Speed | Resolution lines per mm |
|---|---|---|---|---|
| CaWo₄ | 6.08 | .0011 mr | 1.0 | 14 |
| LaOBR.002 Tm | 6.30 | .0023 mr | 3.3 | 14 |

It can be noted from the above table that for the same screen thickness, the phosphor of the present invention has over twice the X-ray absorption at 80 KV peak and three times the speed of response as calcium tungstate.

Additionally, there is shown in Table II below the results in relative speed of response, resolution and relative brightness for the present phosphor compared with the LAOCl: 0.002 Tm phosphor prepared according to the aforementioned Russian patent as both are compared with conventional calcium tungstate.

TABLE II

| Sample | Relative Brightness (%) | Resolution lines per mm | Relative Speed (Times) |
|---|---|---|---|
| LaOCL: .003 Tm | 44 | 11 | 1.45 |
| LaOBr: .002 Tm | 100 | 14 | 3.3 |
| CaWO₄ | 32 | 14 | 1.0 |

From Table II, it can be observed that while the prior art phosphor exhibits better speed of response than calcium tungstate there is accompanying poorer resolution attributable to unsuitable particle size and shape. The cumulative result renders such material generally unsuitable for X-ray image converter applications.

Still further comparative measurements were made to determine optimum activator concentrations for the phosphor products of the present invention when used in X-ray image converter applications. Table III below lists various activator concentrations for the same phosphor host material along with measurements in speed of response under the same X-ray exposure conditions previously mentioned when compared with corresponding calcium tungstate screen.

TABLE III

| Composition | Speed relative to CaWO$_4$ Phosphor |
|---|---|
| LaOCl.001 Tm | 1.8 |
| LaOCl.002 Tm | 2.6 |
| LaOCl.005 Tm | 1.9 |

It can be seen from Table III above that the optimum thulium activator concentrations are between 0.002 and 0.003 moles thulium per mole of phosphor which on a mole percent basis calculates to a range of 0.2–0.3 mole percent. Comparable results are obtained with GdOBr:Tm and GdOCl:Tm phosphors prepared in accordance with the present invention.

It will be apparent from the foregoing description that an improved luminescent material has been provided for general use in X-ray image converter applications which exhibits greater light production efficiency than prior art phosphors. It should also be appreciated from the foregoing description that luminescent materials of the present invention can be prepared from different starting materials than herein disclosed, so that it is intended to limit the present invention, therefore, only by the scope of the following claims.

What I claim as new and desire to secure by letters Patent of the United States is:

1. An X-ray image converter comprising well-formed crystals of a material essentially, according to the formula:

$$LnOX:Tm^{+3}$$

wherein,
Ln is one or more of La and Gd
X is one or more of Cl and Br
Tm is present as an activator from about 0.05 to 1 mole percent, with said phosphor crystals having an average particle size of 2 microns diameter or greater and exhibitng approximately 3.3 times the speed of a conventional calcium tungstate phosphor in the 40–100 KeV region of the X-ray spectrum.

2. An image converter, according to claim 1 comprising a radiographic intensifier luminescent screen which comprises the phosphor supported on a base member, said phosphor being capable of converting X-radiation to radiation of longer wavelength.

3. A luminescent screen, as in claim 2 adapted for intensifiying the exposure of photographic film to X-radiation.

4. An image converter of claim 2 wherein said phosphor is a thulium-activated lanthanum oxybromide.

5. An image converter of claim 2 wherein said phosphor is a thulium-activated lanthanum oxychloride.

* * * * *